United States Patent Office.

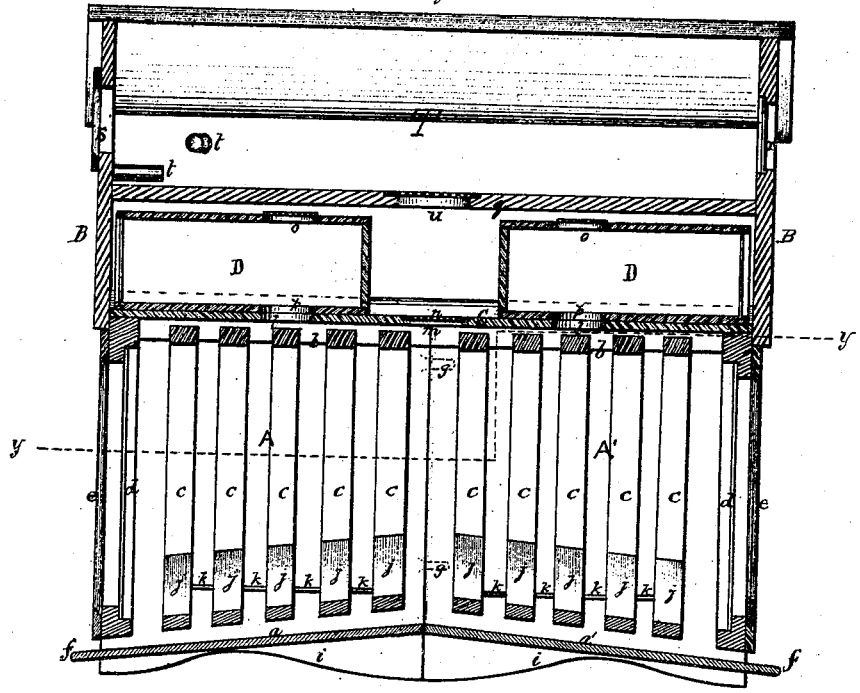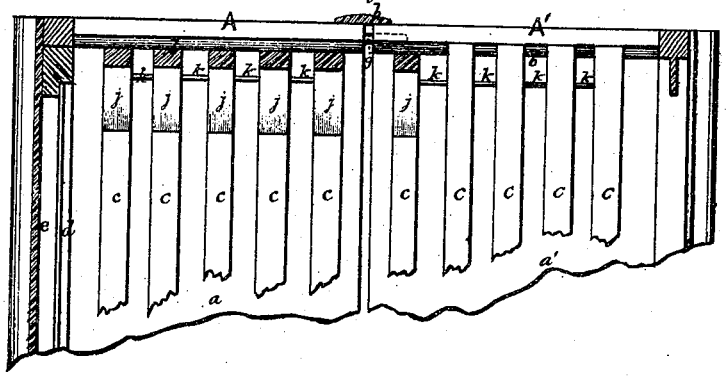

JOSEPH BEHE, OF CARROLLTOWN, PENNSYLVANIA.

Letters Patent No. 108,960, dated November 8, 1870.

IMPROVEMENT IN BEE-HIVES.

The Schedule referred to in these Letters Patent and making part of the same.

*To all whom it may concern:*

Be it known that I, JOSEPH BEHE, of Carrolltown, in the county of Cambria and State of Pennsylvania, have invented a certain new and useful Improvement in Bee-Hives; and I do hereby declare the following to be a full, clear, and exact description thereof, sufficient to enable those skilled in the art to which my invention relates to fully understand and to make and use the same, reference being had to the accompanying drawing forming part of this specification, and in which—

Figure 1 is a longitudinal central section of my improved bee-hive, and

Figure 2 is a view, partly in plan and partly sectional, of the lower part of the hive, the plane of section being indicated by the line $y\ y$ in fig. 1.

This invention consists in the general construction and arrangement of parts, as hereinafter fully described and claimed.

Similar letters of reference indicate like parts in the two figures.

The basement of my hive, which contains the comb-frames, is made in two sections, A A', constructed with bottoms, $a\ a'$, inclined in opposite directions, and with ledges, $b\ b$, for the support of the comb-frames $c\ c$.

Each section A A' is provided with a glass front, $d$, which is covered by a slide, $e$, under which is the bee-entrance $f$.

In the edge of one of the sections are fitted pins, $g\ g$, which enter corresponding recesses in the other sections, to connect the parts together; and this connection is strengthened by overlapping vertical strips or battens, $h$, secured to one or the other of the sections.

The parts A A' are held in contact and prevented from separating by the upper part B of the hive, which fits down over the upper edges of the sections, and rests on the tops of the battens $h$.

The ends $i\ i$ of the sections A A' project below the bottoms $a\ a'$ thereof, and constitute supports for the hive.

The pendant comb-frames are braced, at their lower inner corners, by triangular blocks, $j$, and kept from too close contact by projecting pins, $k$, set in the edges of the frames. As will be seen, the frames are of different depths, so that their bottoms are all equally distant from the inclined floor of the hive.

On top of the sections A A' is placed a floor, C, provided with three long openings, $l\ m\ l$.

The central opening, $m$, is covered with wire-gauze, $n$, to prevent the passage of moths and other intruders. This floor is made with vertical strips at the sides.

D D are the honey-boxes, made with glass fronts and openings, $o\ p$, corresponding to the openings in the floor C. These boxes are so placed on the said floor that the openings in the latter register with those in the bottoms of the boxes. The openings in the tops of the boxes are covered, like the opening $m$, with wire-gauze.

The upper part B of the box or hive is, preferably, provided with a peaked roof, and is divided, by a horizontal partition, $q$, into compartments, the upper one, T, of which is the moth-trap.

In the floor of the latter is an opening, $u$, similar to and immediately over that in the floor C, and is, in like manner, protected with gauze.

In each end of the moth-trap is an opening, one of which is fitted with a fixed glass window, $r$, while the other is provided with a sliding door, $s$.

In openings in the sides of the trap, in one end, near the sliding door, are inserted tubes, $t\ t$, which enter the trap obliquely, and constitute the entrances thereto.

It will be seen that the air, which enters the lower part of the hive, passes up between all the comb-frames, and, by way of the opening $m$ and through the honey-boxes when empty or partially filled, enters the space between the floors C $q$, and thence through the opening in the latter floor, passes into the moth-trap, whence it escapes at the tubes $t\ t$, carrying with it the scent from the hive. This draws the moths and other injurious insects which enter the trap through the tubes $t$; and, being attracted by the light from the glass window $r$, they fail to find the openings at which they came in, and are prevented from obtaining access to the lower part of the hive by the gauze which covers the openings leading thereto.

After lifting off the top of the hive and the surplus honey-boxes, the sections A A' can be separated from each other, half of the comb-frames remaining in each part.

By this construction I am enabled to separate the hive of bees instead of allowing them to swarm; for instance, taking two hives, one containing bees, and the other empty, I separate the sections, and apply an empty section to each full one, and thus provide two working-hives of bees.

From the above description, it will be seen that, in this hive, of simple and practical construction, the features of perfect ventilation, protection against moths, and their destruction, and the prevention of swarming, are so combined as to render the invention valuable to those engaged, for pleasure or profit, in the culture of bees.

I do not claim, broadly, the construction of the lower part of the hive in sections, as this is not new; but

Having thus described my invention, What I claim as new, and desire to secure by Letters Patent, is—

An improved bee-hive, composed of the detachable sections A A', top B, floor C, honey-boxes D, and comb-frames c, with the ventilating-apertures u m o o, and moth-trap T, all constructed and arranged substantially as herein described and shown.

JOSEPH BEHE.

Witnesses:
 HENRY SCANLAN,
 F. BEARER.